United States Patent
Lee et al.

(10) Patent No.: US 8,003,163 B2
(45) Date of Patent: Aug. 23, 2011

(54) MAGNETIC RECORDING MEDIUM AND METHOD OF MANUFACTURING THE SAME

(75) Inventors: Du-hyun Lee, Yongin-si (KR);
Seong-yong Yoon, Yongin-si (KR);
Jin-seung Sohn, Yongin-si (KR);
Byung-kyu Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1134 days.

(21) Appl. No.: 11/748,566

(22) Filed: May 15, 2007

(65) Prior Publication Data
US 2008/0084635 A1    Apr. 10, 2008

(30) Foreign Application Priority Data
Oct. 4, 2006   (KR) .................. 10-2006-0097571

(51) Int. Cl.
*G11B 5/82* (2006.01)
(52) U.S. Cl. ....................................... 427/128
(58) Field of Classification Search .......... 427/127, 427/128, 132
See application file for complete search history.

(56) References Cited

U.S. PATENT DOCUMENTS

| | | | | |
|---|---|---|---|---|
| 6,194,048 B1 * | 2/2001 | Hatakeyama et al. | ..... | 428/848.3 |
| 7,374,831 B2 * | 5/2008 | Araki et al. | ..... | 428/832 |
| 2004/0182820 A1 * | 9/2004 | Motowaki et al. | ..... | 216/44 |
| 2005/0255336 A1 * | 11/2005 | Mukai | ..... | 428/831 |
| 2006/0040140 A1 * | 2/2006 | Kaizu et al. | ..... | 428/829 |
| 2006/0088733 A1 | 4/2006 | Hosoe et al. | | |
| 2006/0286345 A1 * | 12/2006 | Nakao | ..... | 428/131 |

FOREIGN PATENT DOCUMENTS

| CN | 1767009 A | 5/2006 |
|---|---|---|
| JP | 2006-012285 | 1/2006 |

OTHER PUBLICATIONS

Office Action dated Jun. 4, 2010 from the Statement Intellectual Property Office of P.R. China in Chinese Patent Application 200710136235.3.

* cited by examiner

*Primary Examiner* — Michael Cleveland
*Assistant Examiner* — Tabassom Tadayyon Eslami
(74) *Attorney, Agent, or Firm* — Sughrue Mion, PLLC (57) ABSTRACT

Provided are a magnetic recording medium and a method of manufacturing the magnetic recording medium. The magnetic recording medium includes a substrate, a soft magnetic underlayer formed on the substrate, a texturing layer formed on the soft magnetic underlayer and including a uniform pattern, and a recording layer including magnetic grains and a non-magnetic boundary region isolating the magnetic grains. The magnetic grains and the non-magnetic boundary region of the recording layer are formed into a regular granular structure by segregation according to the regular pattern of the texturing layer. Therefore, a regular granular structure can be formed in the recording layer without a process such as etching of the recording layer, so that the recording density of the magnetic recording medium can be largely improved.

17 Claims, 8 Drawing Sheets

MAGNETIC RECORDING MEDIUM AND METHOD OF MANUFACTURING THE SAME

CROSS-REFERENCE TO RELATED PATENT APPLICATION

This application claims the benefit of Korean Patent Application No. 10-2006-0097571, filed on Oct. 4, 2006, in the Korean Intellectual Property Office, the disclosure of which is incorporated herein in its entirety by reference.

BACKGROUND OF THE INVENTION

1. Field of the Invention

The present invention relates to a magnetic recording medium and a method of manufacturing the magnetic recording medium, and more particularly, to a magnetic recording medium having a patterned granular structure and a method of manufacturing the magnetic recording medium.

2. Description of the Related Art

Various methods have been proposed to fabricate a magnetic recording medium having a magnetic grain pattern. They include: 1) forming a nano hole pattern on a substrate using a nano-imprint method, followed by forming a recording layer by electrolytic plating, vapor deposition, or the like to fill nano holes formed on the substrate; 2) forming a nano pillar pattern on a substrate including a recording layer through the nano-imprint method or the like and etching the recording layer; 3) forming nano pillars on a substrate using a nano-imprint method and etching the substrate to form a nano pillar array on the substrate, followed by depositing a recording layer on the substrate, which is provided with the nano pillar array, so as to form a physically separated nano pillar array structure; or 4) depositing a recording layer on a substrate, and patterning the recording layer by implanting ions selectively into the recording layer using a stencil mask having nano holes so as to selectively change magnetic characteristics of the recording layer.

The magnetic characteristics of recording layers formed by the above-described methods are usually inferior compared to a recording layer formed by sputtering in a conventional continuous method. Unfortunately, sputtering is also disadvantageous since the magnetic characteristics of a recording medium containing the recording layer produced by sputtering can deteriorate or the recording layer can be contaminated during the deposition of the recording layer on nano holes or nano pillars or during subsequent operations such as etching, lifting-off, or ion implantation.

SUMMARY OF THE INVENTION

The present invention provides a magnetic recording medium including a recording layer in which a regular granular structure is formed without the need for an additional treatments, and a method of manufacturing the magnetic recording medium.

According to an aspect of the present invention, there is provided a magnetic recording medium including a soft magnetic underlayer, a texturing layer, and a recording layer that are sequentially stacked on a substrate, wherein the texturing layer includes a regular pattern, and the recording layer includes magnetic grains formed corresponding to the regular pattern of the texturing layer.

According to another aspect of the present invention, there is provided a method of manufacturing a magnetic recording medium including a soft magnetic underlayer, a texturing layer, and a recording layer that are sequentially laminated on a substrate, the method including forming a regular pattern in a texturing layer, wherein the regular pattern is formed of isolated protruded portions and trenches surrounding the isolated protruded portions, and forming the recording layer to have a regular granular structure, the granular structure being formed of magnetic grains, which are formed corresponding to respective isolated protruded portions of the texturing layer, and a non-magnetic region, which is formed corresponding to the trenches.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

A magnetic recording medium and a method of manufacturing the magnetic recording medium will now be described more fully with reference to the accompanying drawings, in which exemplary embodiments of the invention are shown.

Figure 1A:
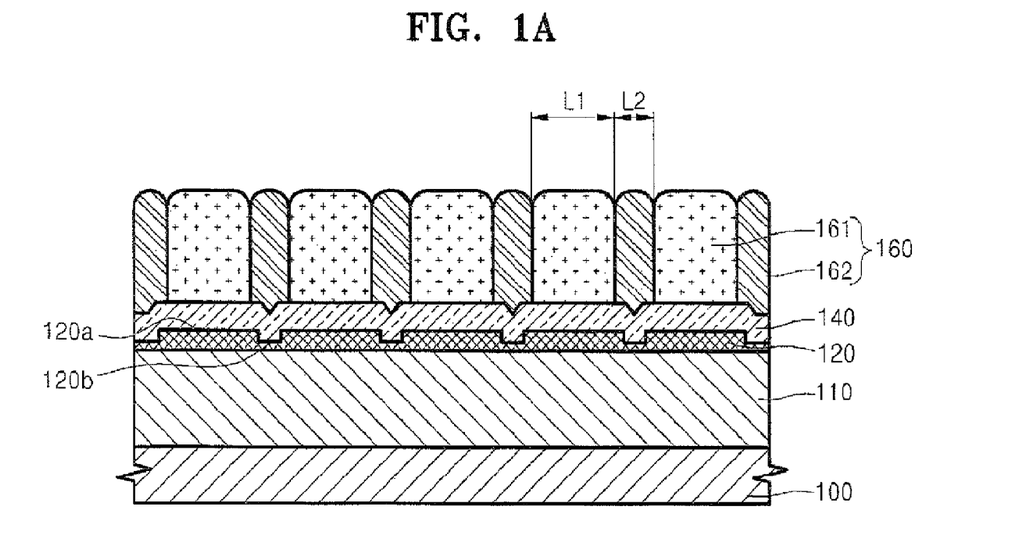
FIG. 1A is a schematic sectional view illustrating a magnetic recording medium according to an embodiment of the present invention.
Figure 1B:
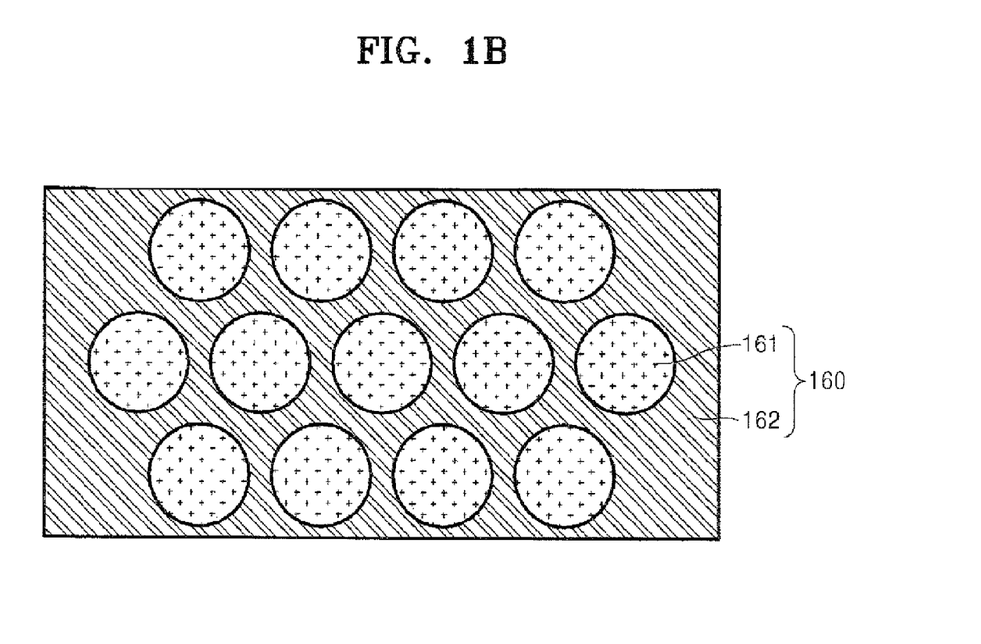
FIG. 1B is a view illustrating a granular structure of a recording layer of the magnetic recording medium of FIG. 1A according to an embodiment of the present invention.

FIG. 1A is a schematic sectional view illustrating a magnetic recording medium according to an embodiment of the present invention, and FIG. 1B is a view illustrating a granular structure of a recording layer 160 of the magnetic recording medium of FIG. 1A according to an exemplary embodiment of the present invention.

Referring to FIGS. 1A and 1B, the magnetic recording medium according to the current embodiment of the present invention has a laminate structure formed on a substrate 100. The laminate or sequentially stacked structure includes a soft magnetic underlayer 110, an interlayer 120, a texturing layer 140, and the recording layer 160 including magnetic grains 161. The current embodiment of the present invention is characterized by a pattern formed in the interlayer 120 for adjusting the size and arrangement of the magnetic grains 161 of the recording layer 160. A passivation layer (not shown) can be formed on the recording layer 160 to protect the recording layer 160. Further, a lubrication layer (not shown) can be formed on the passivation layer so as to reduce abrasion of a magnetic head and the passivation layer when the magnetic head collides with the passivation layer or slides on the passivation layer.

The substrate 100 is formed of a glass substrate, an aluminum alloy substrate, or a silicon substrate. Conventionally, the substrate 100 may be disk shaped.

The soft magnetic underlayer 110 facilitates the flux of a magnetic field from a magnetic head (not shown) through a magnetic circuit in the magnetic recording medium, so that the recording layer 160 can be effectively magnetized. To do this, the soft magnetic under layer 110 is formed of a soft magnetic material having high permeability and low coercivity. Further, the soft magnetic underlayer 110 can be formed of a plurality of sub layers.

The interlayer 120 is formed of a non-magnetic metal, an oxide, a nitride, or a polymer compound.

The interlayer 120 is formed on the soft magnetic underlayer 110. An original pattern corresponds to the regular granular structure of the recording layer 160 is formed in a top surface of the interlayer 120. The pattern of the interlayer 120 can be formed through a nano-imprint method (described later). The pattern of the interlayer 120 includes protruded portions 120a which correspond to the magnetic grains 161 of the recording layer 160 and trenches 120b formed between the protruded portions 120a. The protruded portions 120a are arranged at a pitch of about several nanometers to several tens of nanometers. The pitch of the protruded portions 120a may vary according to recording density. The trenches 120b have a depth of about several nanometers or several tens of nanometers.

The texturing layer 140 is formed to induce the formation of the granular structure of the recording layer 160. The texturing layer 140 is stacked on the interlayer 120 such that the texturing layer 140 is patterned in correspondence with the protruded portions 120a and the trenches 120b of the pattern formed in the interlayer 120. Therefore, when the recording layer 160 is formed on the texturing layer 140, the recording layer 160 can be patterned into a granular structure since the texturing layer 140 is patterned in correspondence with the pattern of the interlayer 120. Trenches formed in the texturing layer 140 have a depth of several tens of nanometers like the depth of the trenches 120b of the interlayer 120. The texturing layer 140 may be formed using at least one of Ru, MgO, and Pt. For example, when the magnetic grains 161 of the of the recording layer 160 are formed of a cobalt (Co)-based magnetic material such as CoPt, CoPd, or CoCrPt, the texturing layer 140 may be formed of Ru or an Ru alloy. The reason for this is due to the crystallographic properties of Ru or the Ru alloy. That is, Ru is a non-magnetic, single-element metal having a lattice constant closest to that of CoCrPt. When the magnetic grains 161 of the recording layer 160 are formed of a Fe-based magnetic alloy such as FePt or FePd, the texturing layer 140 may be formed of MgO, Pt, or a Pt alloy.

The recording layer 160 has the granular structure including the magnetic grains 161 and a non-magnetic boundary region 162. The magnetic grains 161 and the non-magnetic boundary region 162 of the recording layer 160 are simultaneously formed to a height of about several nanometers to several tens of nanometers through a growth method.

The magnetic grains 161 of the recording layer 160 are grown on areas which each correspond to protruded portions of the texturing layer 140 to a regular pattern structure. The magnetic grains 161 exhibit perpendicular magnetic anisotropy. The magnetic grains 161 may be formed of a Co-based or Fe-based magnetic alloy. For example, the magnetic grains 161 may be formed of at least one material selected from the group consisting of CoPt, FePt, CoPd, FePd, and CoCrPt.

The non-magnetic boundary region 162 of the recording layer 160 surrounds the magnetic grains 161 in order to isolate the magnetic grains 161 from each other. The non-magnetic boundary region 162 may be formed of at least one material selected from the group consisting of $SiO_2$, $TiO_2$, $ZrO_2$, and SiN.

For example, when the texturing layer 140 is formed of Ru and the recording layer 160 is formed of $CoCrPt$—$SiO_2$, CoCrPt crystals grow on the protruded portions (having a Ru crystal structure) of the texturing layer 140 to form CoCrPt magnetic grains 161, and $SiO_2$ that is segregated from the CoCrPt crystals grows on the trenches of the texturing layer 140 to form a $SiO_2$ non-magnetic boundary region 162. In this way, the granular structure of the recording layer 160 is formed. Hence, when the CoCrPt magnetic grains 161 grow on the Ru crystal structure of the texturing layer 140, Co (a main component of the CoCrPt magnetic grains 161) grows in a c-axis direction. Therefore, the CoCrPt magnetic grains 161 have perpendicular magnetic anisotropy. As a result, as shown in FIG. 1B, the recording layer 160 can have the granular structure in which the magnetic grains 161 are regularly arranged with the non-magnetic boundary region 162 interposed between the magnetic grains 161.

Since the magnetic grains 161 isolated by the non-magnetic boundary region 162 are uniformly arranged and have the substantially identical size, one bit can be recorded using at least one of the magnetic grains 161. Therefore, the magnetic recording medium of the present invention can be a bit patterned medium.

Table 1 below shows an exemplary relationship between the recording density of the magnetic recording medium and the sizes of the magnetic grains 161 and the non-magnetic boundary region 162.

TABLE 1

| Recording Density | Pitch | L1 | L2 |
|---|---|---|---|
| 500 Gb/in² | 37 nm | 24 nm | 13 nm |
| 1 Tb/in² | 25 nm | 16 nm | 9 nm |

In Table 1, L1 denotes the diameter of the magnetic grains 161, and L2 denotes the width of the non-magnetic boundary region 162 measured between the magnetic grains 161 (refer to FIG. 1A). Referring to Table 1, when the pitch of the magnetic grains 161 is about 37 nm, the recording density of the magnetic recording medium reaches to 500 Gb/in². When the pitch of the magnetic grains 161 is 25 nm, the recording density of the magnetic recording medium reaches to 1 Tb/in². The diameter of the magnetic grains 161 (L1) and the width of the non-magnetic boundary region 162 (L2) may be properly selected according to the pitch of the magnetic grains 161 so as to ensure the stability of the magnetic characteristics of the recording layer 160. For example, the ratio of L1:L2 can be set to about 2:1 as shown in Table 1. The ratio of L1:L2 can be adjusted for a wide range to obtain the desired magnetic characteristics of the recording layer 160.

Figure 2:
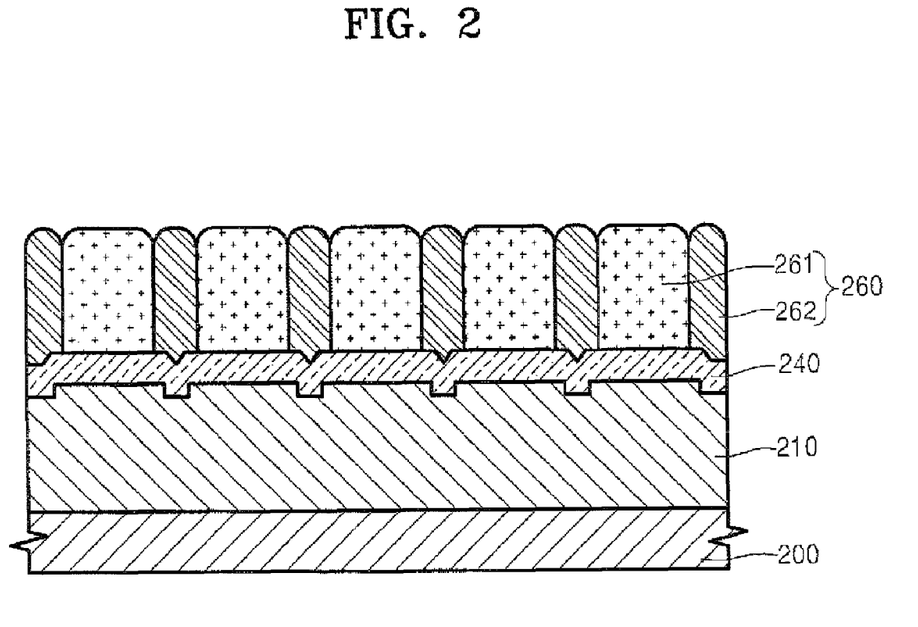
FIG. 2 is a schematic sectional view illustrating a magnetic recording medium according to another embodiment of the present invention.

FIG. 2 is a schematic sectional view illustrating a magnetic recording medium according to another embodiment of the present invention.

Referring to FIG. 2, the magnetic recording medium according to the current embodiment of the present invention has a sequentially stacked structure formed on a substrate 200. The sequentially stacked structure of the magnetic recording medium includes a soft magnetic underlayer 210, a texturing layer 240, and a recording layer 260 including magnetic grains 261. The current embodiment of the present invention is characterized by a pattern formed in a top surface of the soft magnetic underlayer 210 for adjusting the size and arrangement of the magnetic grains 261 of the recording layer 260. That is, unlike the magnetic recording medium of FIG. 1A which contains an interlayer provided with a pattern, the pattern is formed directly in the soft magnetic underlayer 210, and the pattern is transferred to the recording layer 260 through the texturing layer 240 formed between the underlayer 210 and the recording layer 260. The pattern formed in the underlayer 210 according to the current embodiment of the present invention is substantially the same as the pattern formed in the interlayer 120 according to the embodiment of the present invention of FIG. 1A. Further, the texturing layer 240 and the recording layer 260 that are formed on the pattern of the underlayer 210 are substantially the same as those of the magnetic recording medium of FIG. 1A. Thus, detailed descriptions of the texturing layer 240 and the recording layer 260 will be omitted.

FIGS. 3A through 3F illustrate views of a method of manufacturing a magnetic recording medium similar to the magnetic recording medium of FIG. 1A, according to an exemplary embodiment of the present invention. The method of manufacturing the magnetic recording medium is performed by forming a pattern using an imprint resin and transferring the pattern to an interlayer and a texturing layer through an etching operation.

Figure 3A:
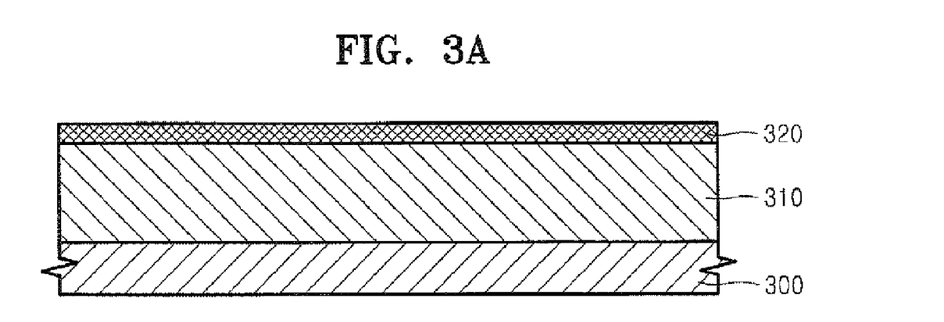
FIGS. 3A through 3F illustrate views for explaining a method of manufacturing a magnetic recording medium similar to the magnetic recording medium of FIG. 1A, according to an embodiment of the present invention.

Referring to FIG. 3A, like the conventional method of manufacturing a magnetic recording medium having perpendicular anisotropy, a soft magnetic underlayer 310 and an interlayer 320 are sequentially stacked on a substrate 300. In the present embodiment, the interlayer 320 is formed by depositing a non-magnetic metal, an oxide, a nitride, or a polymer compound on the soft magnetic underlayer 310 to a thickness of several nanometers to several tens of nanometers. The interlayer 320 can be deposited by a conventional deposition method used in a semiconductor manufacturing method such as sputtering. Thus, a detailed description of the depositing of the interlayer 320 will be omitted.

Figure 3B:
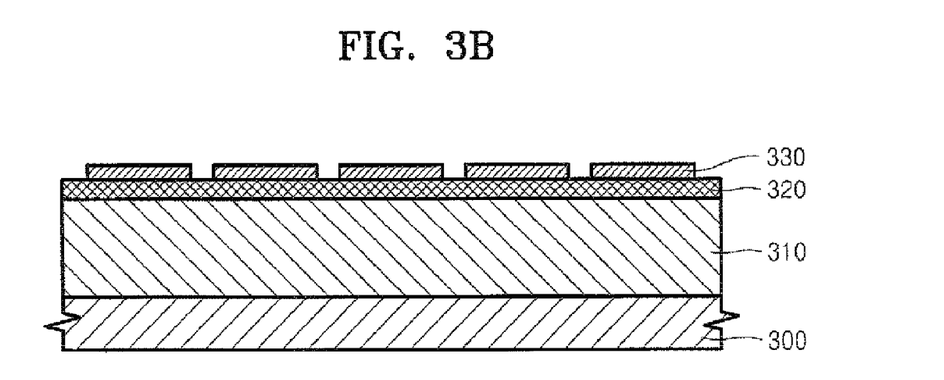

Referring to FIG. 3B, an imprint resin 330 is applied to the interlayer 320 to a thickness of several nanometers to several tens of nanometers in consideration of a etching method that is to be performed on the interlayer 320, and a regular pattern, as shown in FIG. 1B, is transferred onto the resin 330. In the present embodiment, the regular pattern may be transferred onto the resin 330 using a nano-imprint method so as to obtain a pattern with a pitch or other dimensions in the range of several nanometers to several tens of nanometers. Examples of the nano imprint method include, but are not limited to, a thermal imprint process using heat and an UV imprint method using ultraviolet rays. After the pattern is transferred onto the imprint resin 330, nano pillars formed by the patterned resin 330 are uniformly arranged on the interlayer 320.

Figure 3C:
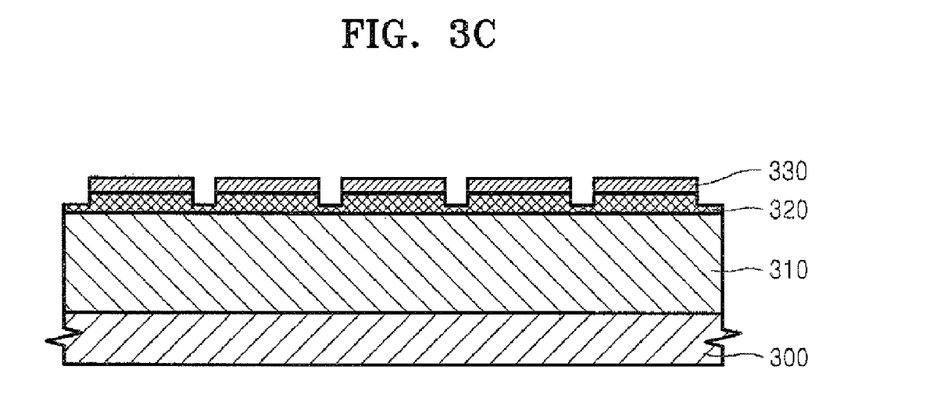

Referring to FIG. 3C, the interlayer 320 is etched to a depth of several nanometers to several tens of nanometers using the patterned resin 330 as a mask. In the present embodiment, the interlayer 320 may be etched using plasma or ion beams (dry etching). However, the etching of the interlayer 320 is not limited to dry etching. That is, the interlayer 320 can be wet etched. After the etching of the interlayer 320, trenches are formed in the interlayer 320 (i.e., the interlayer 320 is patterned).

Figure 3D:
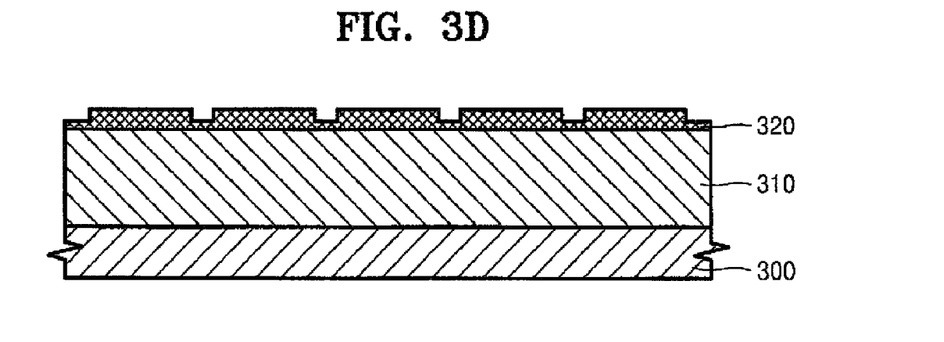

Referring to FIG. 3D, the resin 330 that is used as a mask is removed.

Figure 3E:
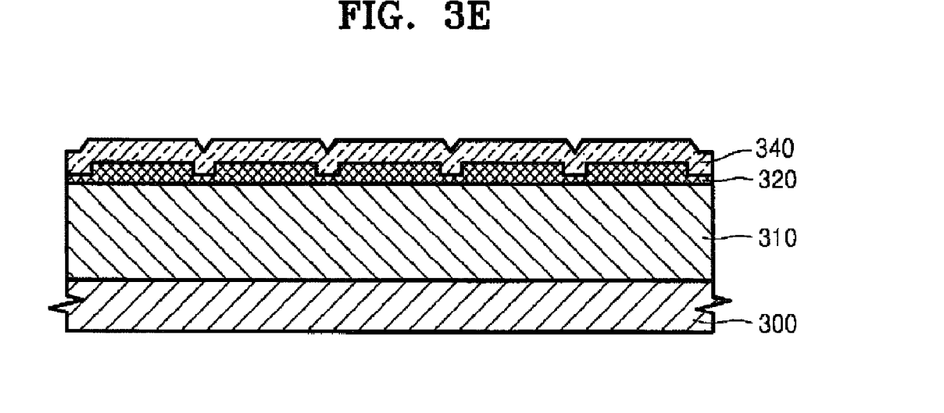

Referring to 3E, Ru is deposited on the patterned interlayer 320 to a thickness of several nanometers to several tens of nanometers to form a texturing layer 340. In the present embodiment, the pattern of the interlayer 320 is directly transferred to the texturing layer 340, and thereby forming protruded portions and trenches in the texturing layer 340. In the present embodiment, Ru is an exemplary material that can be used for forming the texturing layer 340 since Ru is a suitable material for the texturing layer 340 when CoCrPt—$SiO_2$ is used for forming a recording layer 360 as in the following operation. Some other examples of materials that can be used for forming the texturing layer 340 include an Ru alloy, MgO, Pt, and an alloy thereof.

Figure 3F:
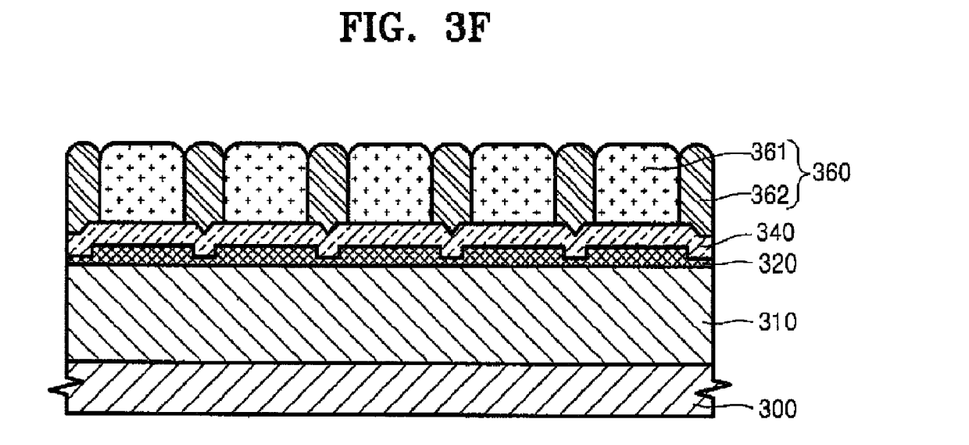

Referring to FIG. 3F, CoCrPt—$SiO_2$ is selectively grown to form the recording layer 360 including magnetic grains 361 and a non-magnetic boundary region 362. The recording layer 360 is formed using a conventional sputtering method, and the magnetic grains 361 and the non-magnetic boundary region 362 are simultaneously formed. In the present embodiment, since the protruded portions of the texturing layer 340 have a Ru crystal structure, CoCrPt of the CoCrPt—$SiO_2$ grows on the Ru crystal structure of the texturing layer 340 as the magnetic grains 361. At the same time, $SiO_2$ is segregated from the CoCrPt—$SiO_2$ of the recording layer 360 and grows on the trenches of the texturing layer 340 as the non-magnetic boundary region 362. CoCrPt—$SiO_2$ is an exemplary material that can be used for forming the recording layer 360. However, a magnetic material, such as a Co-based or Fe-based magnetic alloy (e.g., CoPt, FePt, CoPd, FePd, or CoCrPt), and a non-magnetic material, such as a non-magnetic oxide or nitride (e.g., $SiO_2$, $TiO_2$, $ZrO_2$, or SiN), can also be used for forming the recording layer 360.

In the current embodiment, CoCrPt—$SiO_2$ is deposited on the patterned texturing layer 360 so that the CoCrPt—$SiO_2$ is divided to grow into CoCrPt magnetic grains 361 and the $SiO_2$ non-magnetic boundary region 362. Therefore, the magnetic grains 361 of the recording layer 360 can be arranged more regular as compared with magnetic grains formed in the granular structure of a conventional magnetic recording medium by natural segregation. As a result, each of the magnetic grains 361 can be used to store a bit, and thus the recording density of the magnetic recording medium can be largely improved.

Furthermore, in the current embodiment, the magnetic grains 361 and the non-magnetic boundary region 362 surrounding the magnetic grains 361 are simultaneously formed. Therefore, the recording layer 360 can have a significantly flat surface.

In the current embodiment, the interlayer 320 is patterned using a conventional etching method. However, the interlayer 320 can be patterned using other known methods such as lifting-off or conventional patterning methods. For example, when the lifting-off method is used for forming a pattern in the interlayer 320, an imprint resin is applied to the soft magnetic underlayer 310 before the interlayer 320 is formed by deposition, and then a pattern is transferred to the imprint resin using a nano-imprint method. After that, an interlayer material is deposited on the soft magnetic underlayer 310 including the patterned imprint resin, and then the patterned imprint resin and portions of the interlayer material formed on the patterned imprint resin are removed by lifting-off the patterned imprint resin and portions of the interlayer material formed on the patterned imprint resin so as to form the interlayer 320 having a pattern. Then, the texturing layer 340 and the recording layer 360 are formed in the same way as describe above.

FIGS. 4A through 4E are views for explaining a method of manufacturing a magnetic recording medium similar to the recording medium of FIG. 1, according to another embodiment of the present invention. The method of manufacturing the magnetic recording medium uses an imprint resin as an interlayer.

Figure 4A:
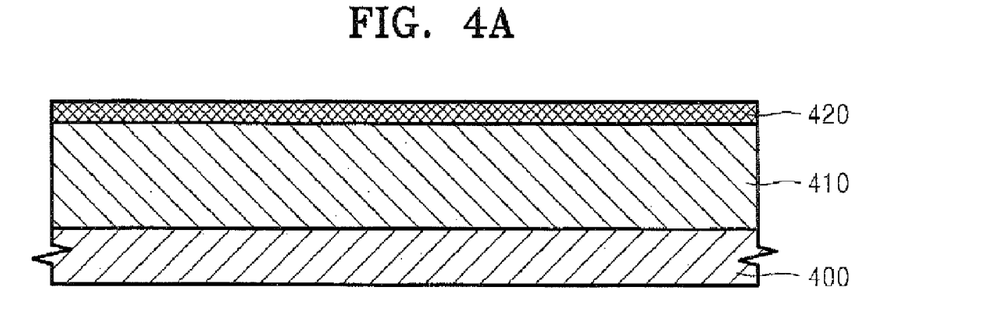
FIGS. 4A through 4E illustrate views for explaining a method of manufacturing a magnetic recording medium similar to the recording magnetic recording medium of FIG. 1A, according to another embodiment of the present invention.

Referring to FIG. 4A, like the conventional method of manufacturing a magnetic recording medium having perpendicular anisotropy, a soft magnetic underlayer 410 is formed on a substrate 400, and an imprint resin 420 is applied to the soft magnetic underlayer 410 to a thickness of several tens of nanometers. Since the imprint resin 420 is hardened to form an interlayer, a suitable polymer material is used as the imprint resin 420. For example, an organo-silicon based polymer compound can be used for the formation of the imprint resin 420.

Figure 4B:
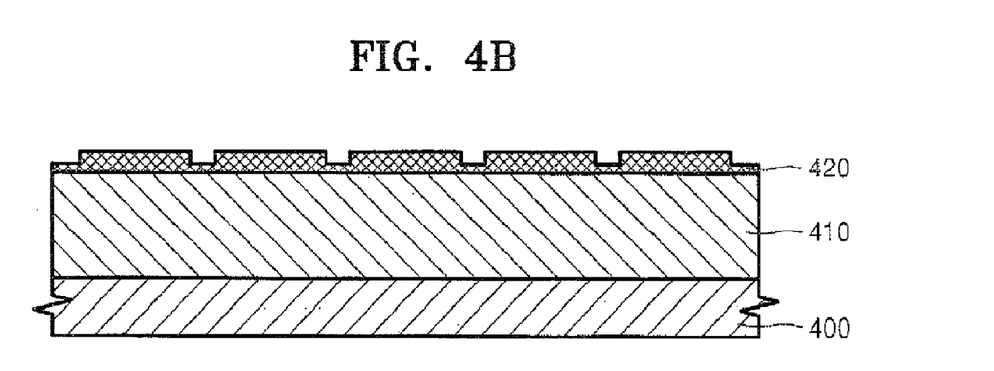
Figure 4C:
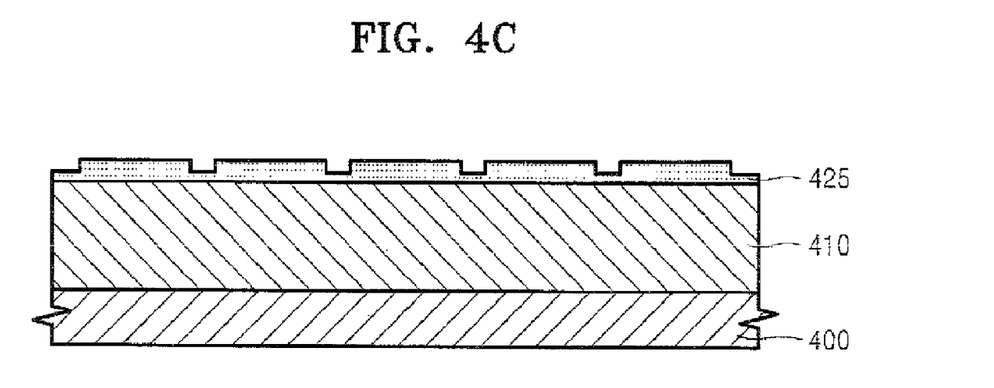

Referring to FIG. 4B, a regular pattern is transferred to the imprint resin 420 as shown in FIG. 1B. In the present embodiment, the regular pattern may be transferred to the imprint resin 420 using a nano-imprint method so as to allow the pattern has a pitch or other dimensions in the range of several nanometers to several tens of nanometers. Examples of the nano imprint method include, but are not limited to, a thermal imprint method using heat and an UV imprint method using ultraviolet rays. Referring to FIG. 4C, after the nano-imprinting is carried out, the patterned imprint resin 420 (refer to FIG. 4B) is hardened to form a patterned interlayer 425.

Figure 4D:
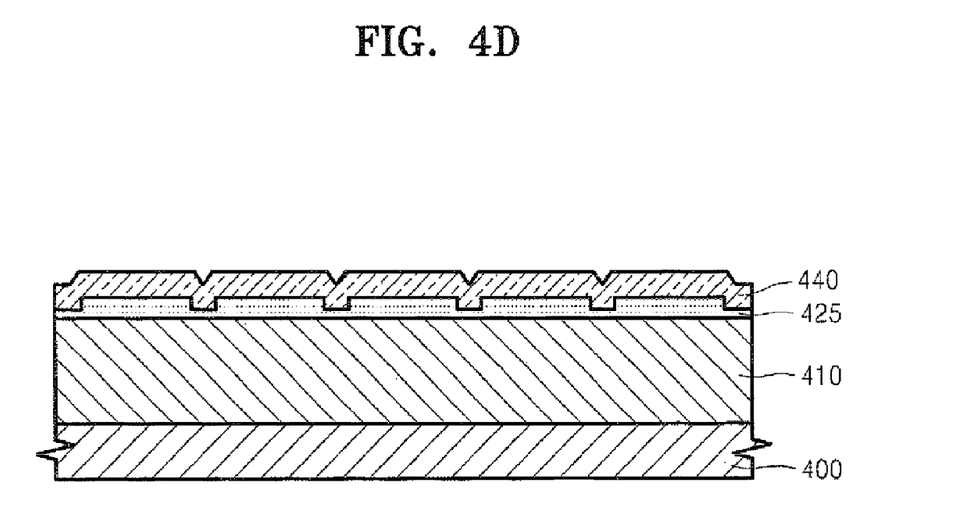
Figure 4E:
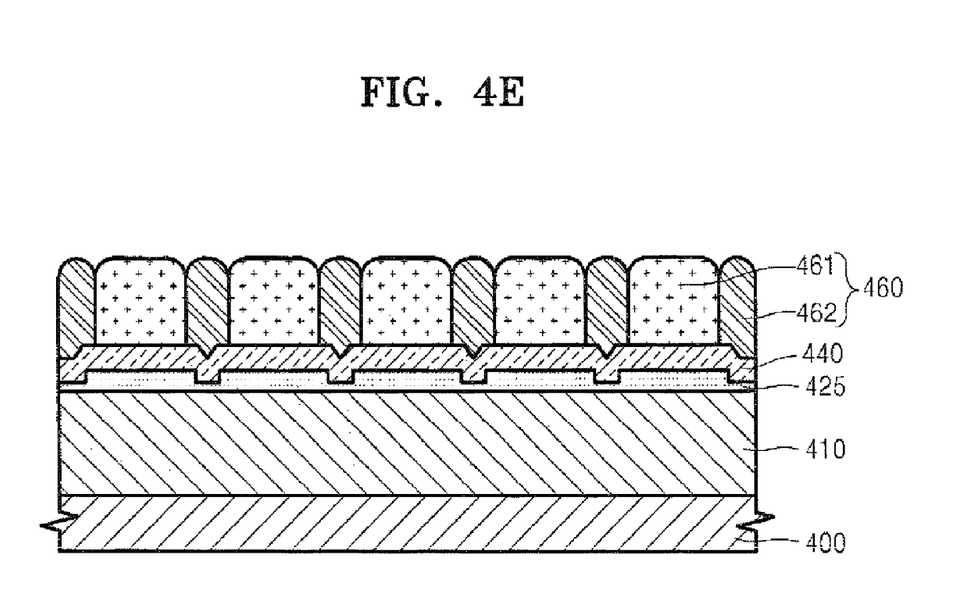

Referring to FIGS. 4D and 4E, Ru grows on the patterned interlayer 425 to form a texturing layer 440, and CoCrPt—$SiO_2$ selectively grows on the texturing layer 440 into magnetic grains 461 and a non-magnetic boundary region 462, thereby forming a recording layer 460 having a granular structure. The texturing layer 440 and the recording layer 460 are formed in the same way as described with respect to FIGS. 3E and 3F. Thus, detailed descriptions of the forming of the texturing layer 440 and the recording layer 460 will be omitted.

FIGS. 5A through 5F are views for explaining a method of manufacturing a magnetic recording medium similar to the magnetic recording medium of FIG. 2, according to another exemplary embodiment of the present invention. The method of manufacturing the magnetic recording medium is performed by forming a pattern on a soft magnetic underlayer and transferring the pattern of the soft magnetic underlayer to a texturing layer without requiring an interlayer.

Figure 5A:
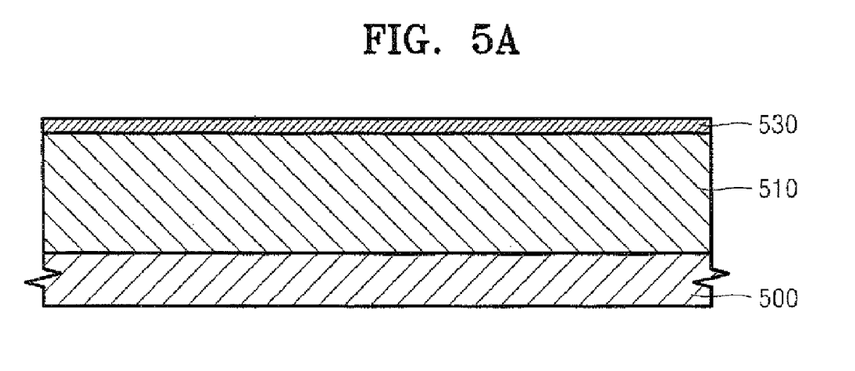
FIGS. 5A through 5F illustrate views for explaining a method of manufacturing a magnetic recording medium according to another embodiment of the present invention.

Referring to FIG. 5A, like the conventional method of manufacturing a magnetic recording medium having perpendicular anisotropy, a soft magnetic underlayer 510 is formed on a substrate 500, and an imprint resin 530 is applied to the soft magnetic underlayer 510 to a thickness of several tens to several hundreds of nanometers.

Figure 5B:
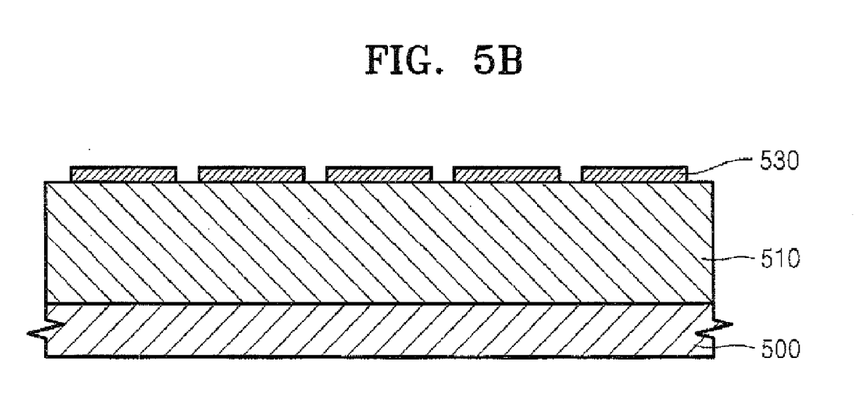

Referring to FIG. 5B, a pattern is transferred to the imprint resin 530 as shown in FIG. 1B using a nano-imprint method.

Figure 5C:
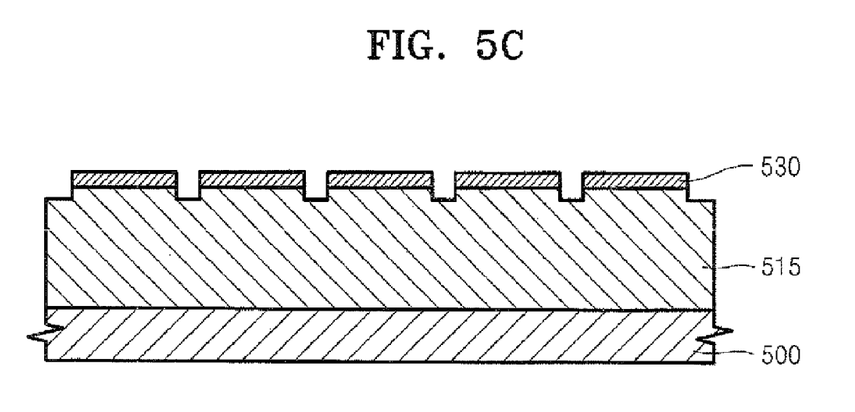

Referring to FIG. 5C, the soft magnetic underlayer 510 is etched to a depth of several nanometers to several tens of nanometers using the patterned imprint resin 530 as a mask, thereby forming a pattern in the soft magnetic underlayer 510 (Hereinafter, the patterned soft magnetic layer is denoted using reference numeral 515).

Figure 5D:
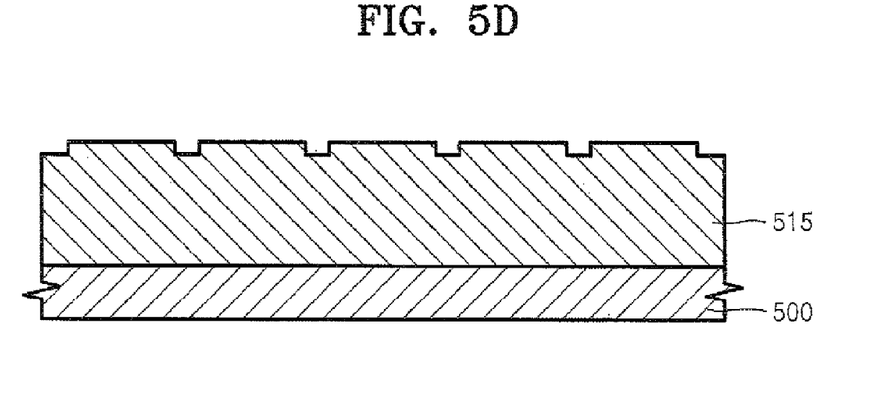
Figure 5E:
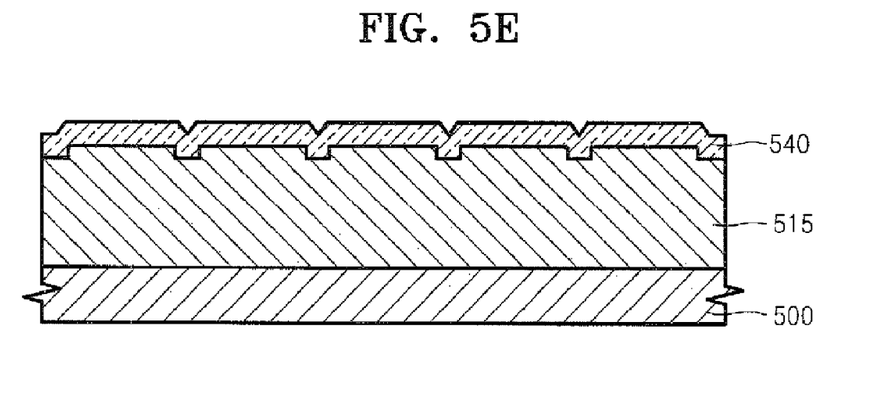
Figure 5F:
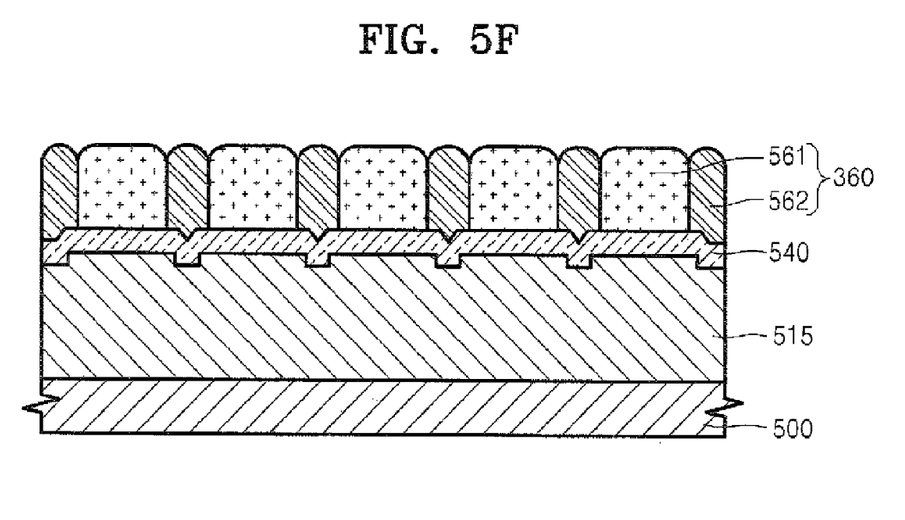

Referring to FIGS. 5D through 5F, the imprint resin 530 that is used as a mask is removed, and Ru is grown in the patterned soft magnetic underlayer 515 so as to form a texturing layer 540. Then, CoCrPt—$SiO_2$ is selectively grown on the texturing layer 540 into magnetic grains 561 and a non-magnetic boundary region 562, and thereby forming a recording layer 560 having the granular structure. The texturing layer 540 and the recording layer 560 of the recording layer 560 are formed in the same way as described in FIGS. 3E and 3F. Thus, detailed descriptions of the forming of the texturing layer 540 and the recording layer 560 will be omitted.

As explained above, the method of manufacturing the magnetic recording medium of the present invention does not require an additional patterning work for the recording medium, so that the recording layer of the magnetic recording medium can be prevented from being magnetically deteriorated and the substrate of the magnetic recording medium can be prevented from being contaminated. In particular, according to the method of manufacturing the magnetic recording medium of the present invention, a magnetic recoding medium can be simply manufactured by forming a regular pattern structure and depositing a material on the structure without subjecting the resulting medium to additional treatments such as the formation of evenly-arranged holes and filling the holes by plating or a lift-off method after deposition. Therefore, the method of manufacturing the magnetic recording medium of the present invention is simple and can be conveniently used.

Furthermore, according to the method of manufacturing the magnetic recording medium of the present invention, granular recording media can be manufactured using the conventional method of manufacturing the magnetic recording medium, except for adding a pattern formation operation prior to the Ru growth operation (texturing layer formation operation). That is, the method of manufacturing the magnetic recording medium of the present invention is highly compatible with the conventional methods of manufacturing the magnetic recording medium.

As described above, the magnetic recording medium and the method of manufacturing the magnetic recording medium of the present invention are advantageous as follows.

First, the magnetic recording medium can have a largely improved recording density by forming the recording layer into a patterned granular structure.

Secondly, since the recording layer does not require an additional patterning work, the recording layer can be prevented from being magnetically deteriorated, and the substrate can be prevented from being contaminated.

Thirdly, the magnetic grains and the non-magnetic boundary region are simultaneously formed to provide a recording layer. Therefore, the recording layer can have a significantly flat surface.

Fourthly, the magnetic recording medium can be manufactured using the conventional manufacturing method except for adding a regular pattern formation operation prior to the deposition of the recording layer. Therefore, the method of manufacturing the magnetic recording medium of the present invention is highly compatible with the conventional method of manufacturing the magnetic recording medium and thus, the method of manufacturing the magnetic recording medium of the present invention can be conveniently used.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a magnetic recording medium comprising a soft magnetic underlayer, a texturing layer, and a recording layer which are sequentially laminated on a substrate, the method comprising forming a regular pattern in a texturing layer by an imprint method, wherein the regular pattern is formed of isolated protruded portions and trenches surrounding the isolated protruded portions, and forming the recording layer on the thus-obtained patterned texturing layer in such a way that the recording layer has a regular granular structure, the granular structure being formed of magnetic grains, which are formed corresponding to respective isolated protruded portions of the texturing layer, and a non-magnetic region, which is formed corresponding to the trenches.

2. The method of claim 1, wherein the texturing layer comprises at least one of Ru, MgO, and Pt.

3. The method of claim 1, wherein the magnetic grains of the recording layer comprise a Co-based or Fe-based magnetic alloy.

4. The method of claim 3, wherein the magnetic grains of the recording layer comprise at least one material selected from the group consisting of CoPt, FePt, CoPd, FePd, and CoCrPt.

5. The method of claim 1, wherein the non-magnetic region of the recording layer comprises a non-magnetic oxide or nitride.

6. The method of claim 5, wherein the non-magnetic region of the recording layer comprises at least one material selected from the group consisting of $SiO_2$, $TiO_2$, $ZrO_2$, and SiN.

7. The method of claim 1, wherein the formation of the regular pattern in the texturing layer comprises:
   forming a pattern in the soft magnetic underlayer using an imprint method; and
   growing a texturing layer on the soft magnetic underlayer so as to form a pattern in the texturing layer, the pattern in the texturing layer being corresponding to the pattern of the soft magnetic underlayer.

8. The method of claim 7, wherein the formation of the pattern in the soft magnetic underlayer comprises:
   applying an imprint resin to the soft magnetic underlayer;
   transferring a pattern to the imprint resin to form a patterned imprint resin on the soft magnetic underlayer;
   etching the soft magnetic underlayer using the patterned imprint resin as a mask; and
   removing the imprint resin.

9. The method of claim 8, wherein the transferring of the pattern to the imprint resin is performed by thermal imprinting or ultraviolet (UV) imprinting.

10. The method of claim 1, wherein the formation of the regular pattern in the texturing layer comprises:
    forming an interlayer on a soft magnetic underlayer;
    forming a pattern in the interlayer using an imprint method; and
    growing a texturing layer on the interlayer so as to form a pattern corresponding to the pattern of the interlayer in the texturing layer.

11. The method of claim 10, wherein the formation of the pattern in the interlayer comprises:
    applying an imprint resin to the soft magnetic underlayer;
    transferring a pattern to the imprint resin to form a patterned imprint resin on the soft magnetic underlayer;
    depositing an interlayer on the patterned imprint resin; and
    forming a pattern in the interlayer using a lift-off method.

12. The method of claim 10, wherein the formation of the pattern in the interlayer comprises:
    applying an imprint resin to the soft magnetic underlayer;
    transferring a pattern to the imprint resin to form a patterned imprint resin on the soft magnetic underlayer; and
    forming the interlayer by hardening the patterned imprint resin.

13. The method of claim 12, wherein the imprint resin comprises an organo-silicon based polymer compound.

14. The method of claim 12, wherein the transferring of the pattern to the imprint resin is performed by thermal imprinting or ultraviolet (UV) imprinting.

15. The method of claim 10, wherein the formation of the pattern in the interlayer comprises:
    applying an imprint resin to the interlayer;
    transferring a pattern to the imprint resin to form a patterned imprint resin on the interlayer;
    etching the interlayer using the patterned imprint resin as a mask; and
    removing the imprint resin.

16. The method of claim 15, wherein the interlayer is formed of one of a non-magnetic metal, an oxide, a nitride, and a polymer compound.

17. The method of claim 15, wherein the transferring of the pattern to the imprint resin is performed by thermal imprinting or ultraviolet (UV) imprinting.

* * * * *